Feb. 7, 1950 — B. A. RATAZAK — 2,496,409
SPRING RETURN DAMPER CONTROL
Filed Aug. 16, 1946 — 4 Sheets-Sheet 1
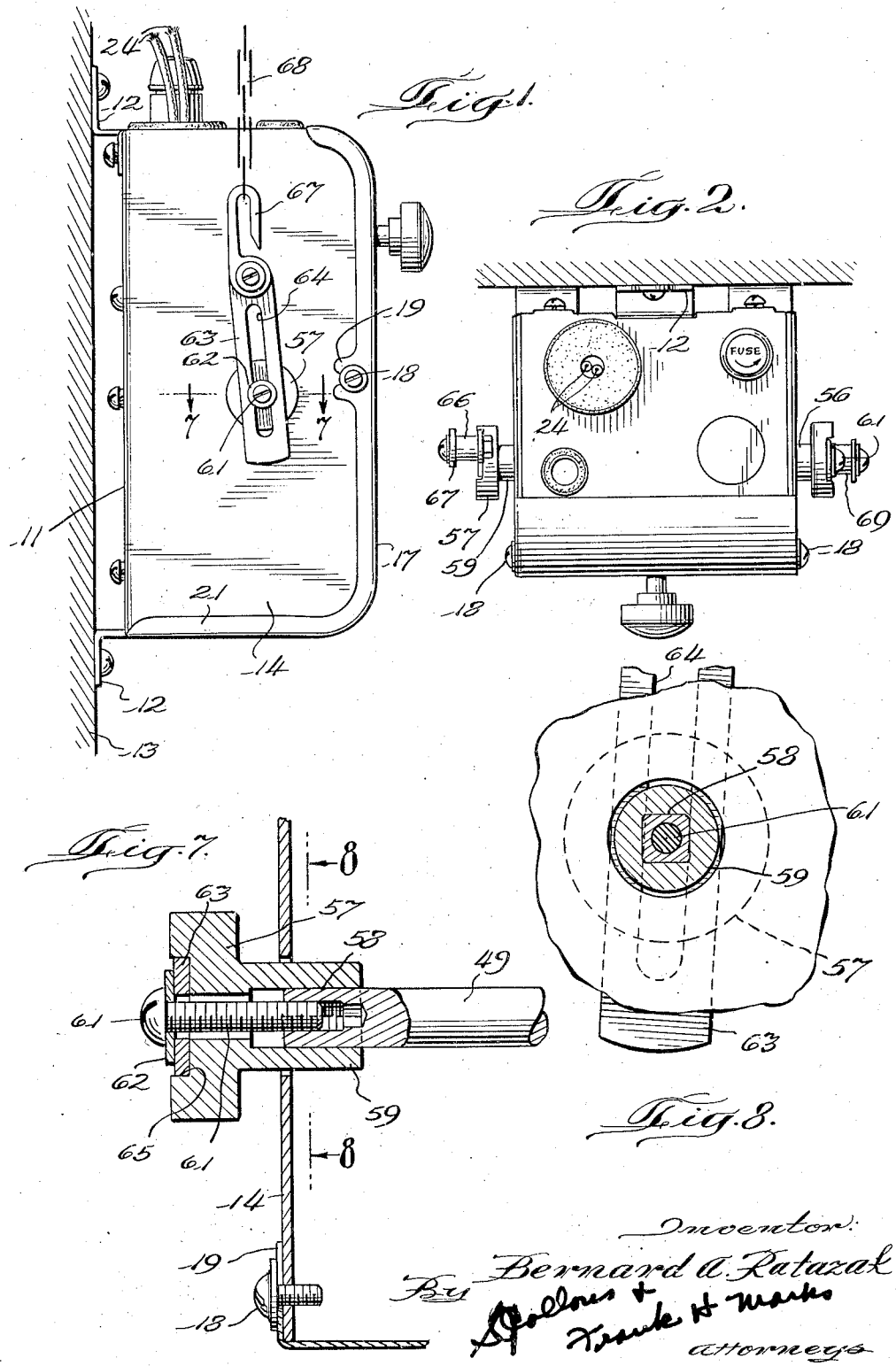
Inventor:
Bernard A. Ratazak

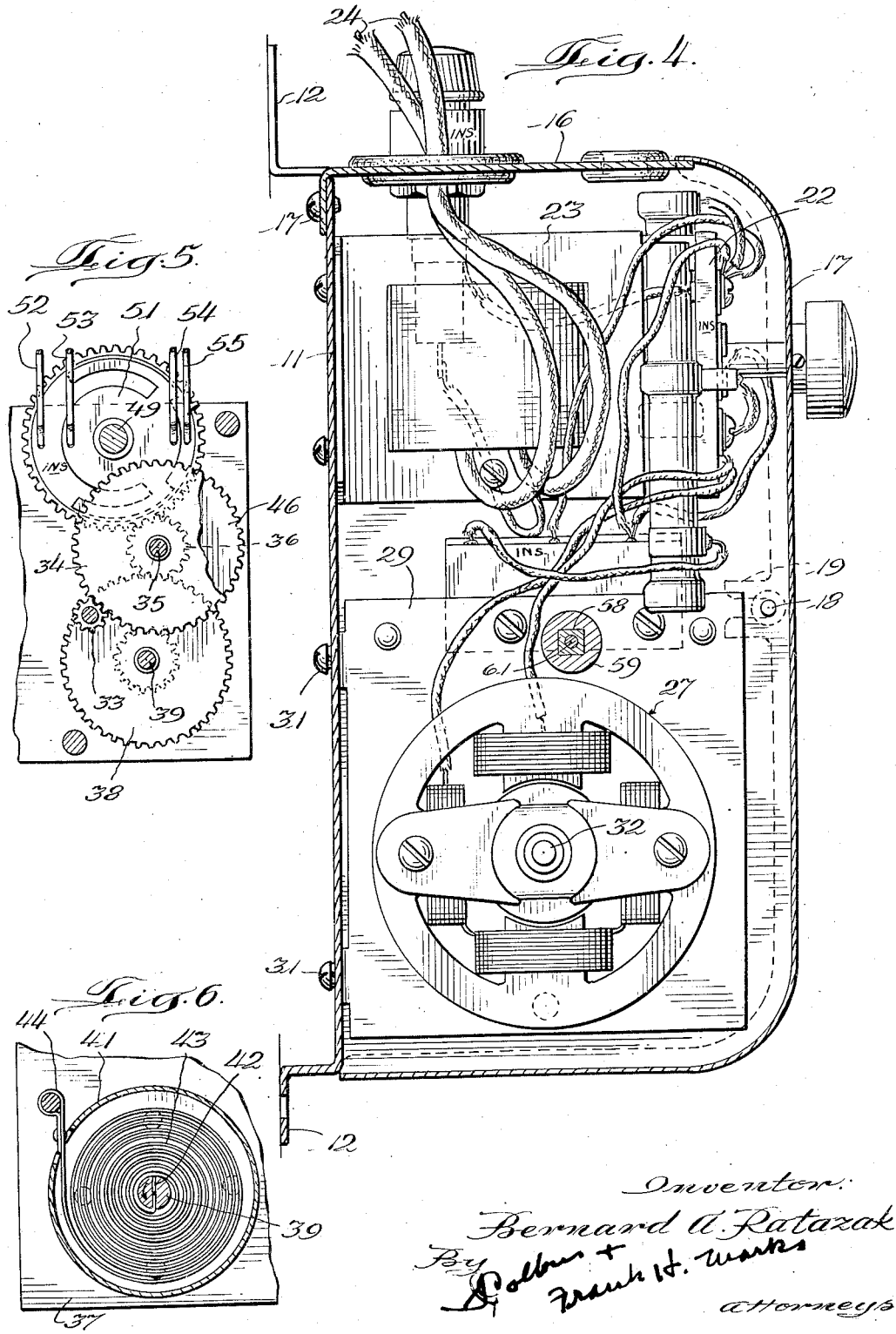

Feb. 7, 1950 — B. A. RATAZAK — 2,496,409
SPRING RETURN DAMPER CONTROL
Filed Aug. 16, 1946 — 4 Sheets-Sheet 4
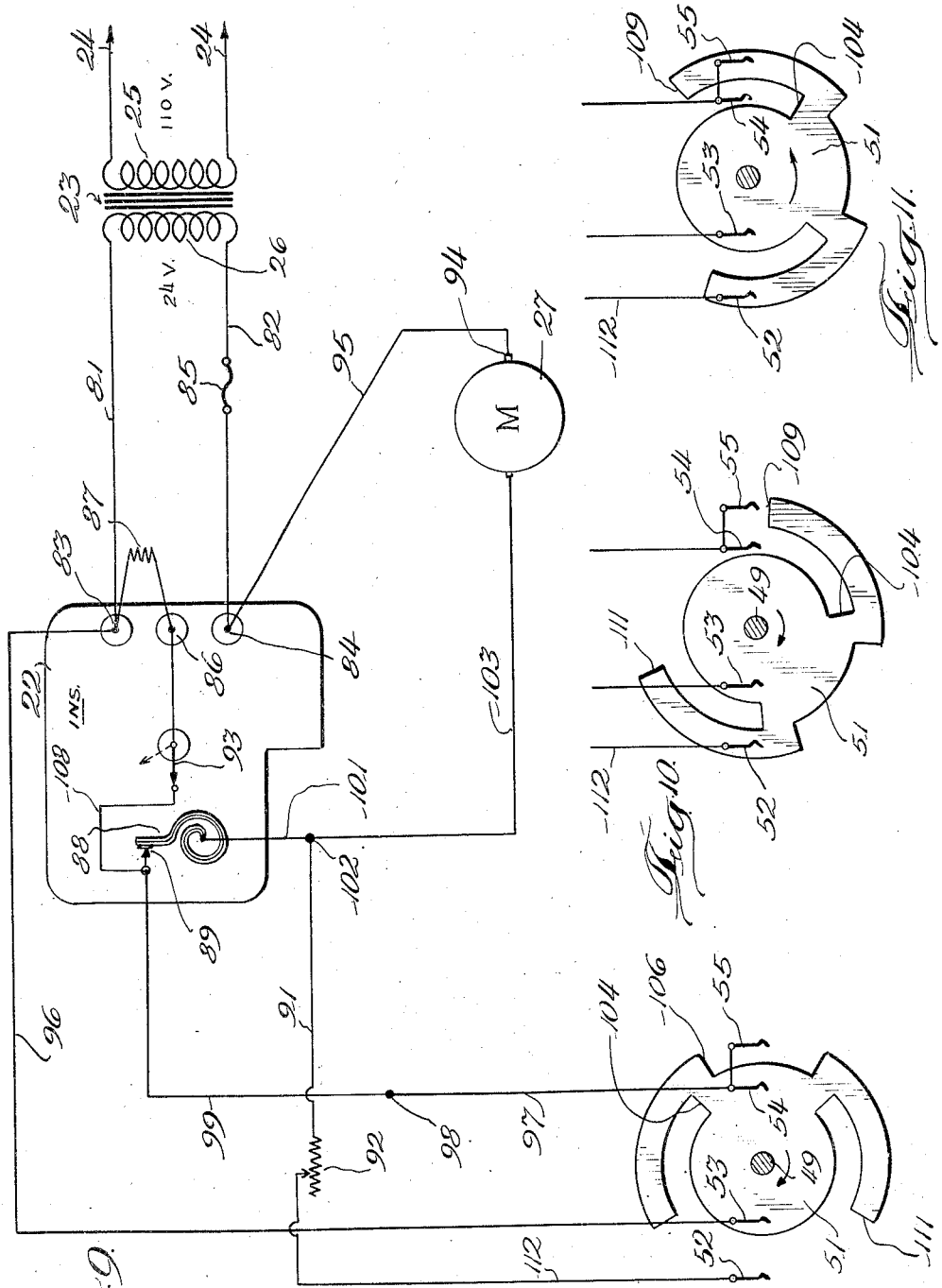

Patented Feb. 7, 1950

2,496,409

UNITED STATES PATENT OFFICE 2,496,409

SPRING RETURN DAMPER CONTROL

Bernard A. Ratazak, Spring Valley, Ill., assignor to Sampsel Time Control, Inc., Spring Valley, Ill., a corporation of Illinois Application August 16, 1946, Serial No. 691,129

6 Claims. (Cl. 318—3)

The present invention relates to apparatus for automatically operating damper and check controls in a heating system and is concerned more particularly with various safeguards including means for automatically checking the fire in the event of electric power failure.

In the operation of furnace or boiler units, fire control is regulated by means of damper and draft check supervision. In response to heat demands the draft door and damper check are customarily opened to permit the intake of combustion supporting air and the continuity of chimney flow until an adequate supply of heat is obtained after which these elements are closed to check the fire pending subsequent demand calls. These operations respond to supervision by a thermostatic heat sensitive regulator usually located at a strategic point within the home or building, and the regulation is initiated and regulated under electric power customarily obtained from a service source. Since it is possible for a service source to fail for any of several reasons, provision is made in the instant apparatus whereby in the event of such failure during a heating cycle the draft and damper regulation is restored to closed condition, and the fire thereby checked so as to prevent any possible damage which would otherwise result by reason of overheating.

In the attainment of these ends, the present invention contemplates a unitary mechanism containing an electrically operated motor having a loading torque spring in opposition thereto so that upon a call for heat there ensues a limited operation of the electric motor and the winding up of a restoration torque spring concurrently with the establishment of draft and damper opening condition. After draft conditions are operated a holding current is maintained to balance the effect of the restoration spring which current prevails throughout the heat demand interval. The electric motor and restoration spring are geared together in a gear train so that the train and motor mechanism are required to be operated by the spring during the latter's restorative movement, whereby this operation is performed with motion checking effects. In this way the power failure mechanical operation is cushioned and the damper and check doors are closed without hazard of breakage such as might result in the event of a free spending restorative spring.

Accordingly, the principal object of the present invention is to obtain a fire regulation performance in a heating system with a safeguard in the event of electric power failure to restore to fire checking condition the damper and draft elements under cushioned or speed regulated movement.

For a more comprehensive understanding of the present invention reference will now be had to the accompanying drawings and to the following detailed specification in which like reference characters designate corresponding parts throughout and in which:

Fig. 1 is a side elevation of a fire control apparatus embodying the present invention mounted on a vertical wall surface.

Fig. 2 is a plan view of the same apparatus.

Fig. 4 is a transverse sectional view taken approximately on line 4—4 of Fig. 3.

Fig. 5 is a fragmentary sectional view of a portion of the gear train taken approximately on line 5—5 of Fig. 3.

Fig. 6 is a fragmentary detail sectional view through the counter-balance and return spring and is taken approximately on line 6—6 of Fig. 3.

Fig. 7 is an enlarged sectional detail view taken approximately on line 7—7 of Fig. 1.

Fig. 8 is an enlarged sectional detail view taken approximately on line 8—8 of Fig. 7.

Figs. 9, 10 and 11 are schematic circuit illustrations of the electrical system associated with the apparatus.

Figure 3:
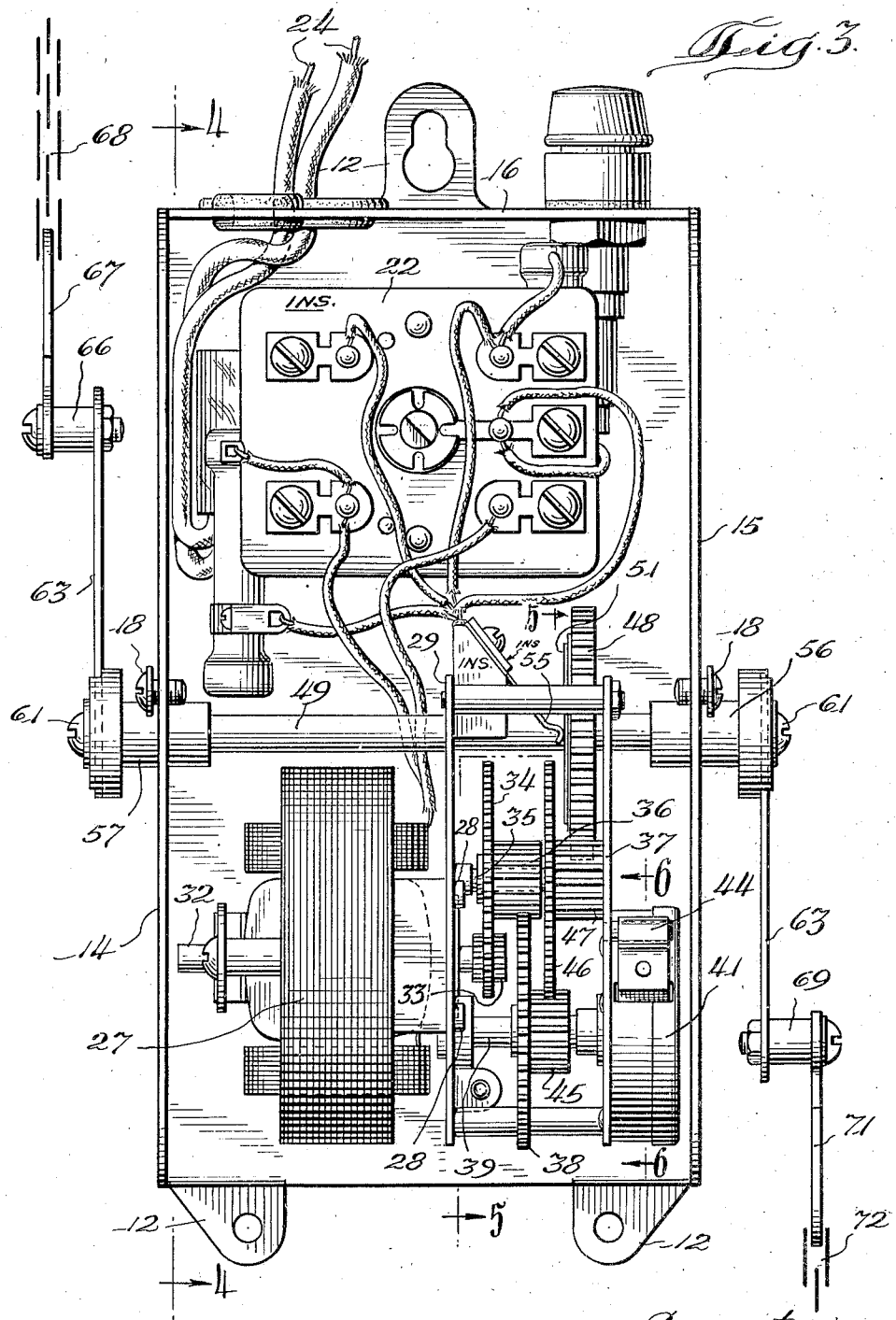
Fig. 3 is an enlarged front elevational view of the unitary containing structure with the front panel removed.

Referring now more particularly to the details of construction, attention is directed to the sheet metal housing elements of which the back panel 11, best shown in Fig. 4, includes the mounting lugs 12 whereby the structure may be secured to a vertical wall surface 13 and the side panels 14 and 15, see also Fig. 3. A top plate 16 is preferably secured as at 17 to the back panel and a curved face plate 17 completes the enveloping enclosure being held in place by the binding screws 18, Figs. 1 and 3, which enter the slotted projection 19 of the rim flange 21.

Within this unitary enclosure there is contained a small panel board 22 upon whose surface there are mounted the several electrical terminal screws which will be described in greater detail hereinafter. Behind the panel 22 there may be noted the voltage reducing transformer 23 whose primary winding 25 is connected to an electric current source by means of the conductors 24 and whose secondary 26 is so related as to deliver 24 volts to an electric circuit system, Fig. 9, subject to further voltage regulation under circuit switching conditions as will later be pointed out.

In the lower left hand corner of the apparatus housing, as viewed in Fig. 3, there is supported an electric motor 27 bolted as at 28 to a framework plate 29 which in turn is anchored as at 31 to the back panel 11. The rotary shaft 32 of motor 27 carries a driving pinion 33 which meshes with a driven gear wheel 34 which is integral with the driving pinion 36 and together the two are rotatably mounted on a shaft 35 which is journaled in the end plates 29 and 31.

Pinion 36 in turn drives gear wheel 38 that is keyed to its shaft 39. The latter is similarly journaled in the end plates 29 and 31 and at its right (Fig. 3) extremity extends into the spring case 41 and receives through its center the inner terminal 42 of an involute spring 43, see also Fig. 6, whose outer extremity is lashed as at 44 to a binding post. Shaft 39 rotates counterclockwise as viewed in Fig. 6, clockwise as viewed in Fig. 5 and after a predetermined number of revolutions, loads the spring 43 which thereafter tends to rotate the shaft 39 in an opposite direction, but for the governor effect of the driving train and magnetomotive responses of the motor 27.

A driving pinion 45 on shaft 39 meshes with the driven wheel 46 integral with shaft 35 and a driving pinion 47 on the latter meshes with the driven gear wheel 48 which is anchored to the function shaft 49 and which carries on its inner face as at 51 the contact plate better viewed in Figs. 5 and 9. Plate 51 serves four wiping contacts indicated in Figs. 5 and 9 by the reference numerals 52, 53, 54 and 55.

In addition to carrying the switching face plate 51 on its integrally associated gear 48, shaft 49 also carries at its extremities the crank arm collars 56 and 57, the latter of which is shown in cross sectional detail in Figs. 7 and 8. In order to secure each of the collars 56 and 57, shaft 41 is preferably squared as at 58, Fig. 8 at its ends where it is received within the bushing portion 59 of its respective collar 56 or 57, and the assembly is held together by means of a threaded shoulder screw 61 which passes through a thrust washer 62 that tightens the crank arm 63 adjustably with respect to their collars as permitted by the elongated slot 64 thereof. The enlarged portion of each collar 56 and 57 is transversely slotted as at 65 for receiving and confining its associated crank arm 63 to be therein nestled and secured by the shoulder screw 61, which also thereby serves to hold the collar 56 or 57 on the end of shaft 48. The adjustment of each crank arm 63 by means of its respective tightening bolt 61 determines the length of thrust of its extremities, which as indicated in Fig. 3, carries the articulation stud 66 to which is secured the link 67 for drawing the temperature control chain 68 and the articulation stud 69 to which is secured a link 71 for drawing the draft control chain 72.

The manner in which the chains 68 and 72 connect with their respective temperature and draft apparatus is too well-known to require more than casual mention. Suffice it to say, however, that as shaft 49 undergoes 180° of rotation, which it does in a clockwise direction as viewed in Fig. 5, chains 68 and 72 are pulled through a sufficient distance to move the draft and temperature control in a manner to stimulate combustion.

At the same time, the contact plate 51, which is carried on the side of insulated gear wheel 48, will rotate clockwise with the shaft 49, as viewed in Fig. 5, and will advance from one position to another as illustrated in Figs. 9, 10 and 11.

The zero position of shaft 49 is such as finds contact plate 51 in the condition illustrated in the principal wiring diagram, Fig. 9, which will be described later. Meanwhile, it is to be noted that driven by motor 27 shaft 49 undergoes a partial cycle of rotation whereupon the current introduced to motor 27 becomes modified under the control of contact plate 51 reducing the voltage by changing the electrical resistance until the turning torque of shaft 32 equals the counter force of spring 43. This condition prevails until the call for heat has been satisfied whereupon the electric circuit becomes further modified so as to reduce the voltage to motor 27 to an extent whereat spring 43 overpowers motor 27, and a reverse rotation throughout the gear train ensues. The manner in which this series of functions is obtained electrically will now be described with particular reference to the circuit disclosure of Figs. 9 to 11.

Lead wires 81 and 82 from the secondary winding 26 of transformer 23 connect with the terminals 83 and 84 through one of which wires there is provided a fusible safety link 85. Terminal 83 is connected to an intermediate terminal 86 on the panel 22 after passing through the holding resistance 87. The room thermostat is indicated conventionally by the reference number 88 and to illustrate the operation is indicated in heat demand condition engaging its contact point 89. It is to be understood, of course, that when this demand is satisfied the bimetallic element of thermostat 88 will withdraw and open at contact 89. The secured end of the thermostat element extends over a conductor 91 to the braking resistance 92. For further illustration a typical operation will now be described.

Manual control switch 93 must be placed into its contact engaging position to complete the circuit whereupon twenty-four volts will be introduced into the winding of motor 27 traceable as follows: From one of the motor connections, 94 over line 95, to the terminal 84, fusible link 85, line 82 through the secondary winding 26, line 81, terminal 83, line 96 to the distributor wiper 53. Thence, the circuit is traceable from the distributor wiper 54 which is now engaging plate 51, over line 97, to the junction 98, thence over line 99, through the contact point 89 and the bimetallic contactor of the thermostat 88, thence over line 101 to the junction 102, line 103 to the return terminal of motor 27.

Under the just described condition, twenty-four volts will course the field winding of motor 27 and will continue to operate the gear train with the result that gear wheel 48 will rotate in a clock-wise direction until it reaches the condition illustrated in Fig. 10, which is approximately 120° from its zero position shown in Fig. 9. While it is undergoing this travel, the contactors 52 and 54 will respectively engage and become disengaged from the plate 51 as follows:

Contactor 55 will ride onto edge 106 and thereafter contactor 54 will ride off edge 104 and contactor 52 will ride onto edge 111. When the apparatus achieves the condition illustrated in Fig. 10, the circuit for motor 27 will then be traceable beginning with the outgoing terminal 94, line 95, junction 84, line 82, winding 26, line 81, to the junction 83. At this time, two courses are available to the circuit from junction 83, one continuing over line 96, wipers 53 and 52, line 112, braking resistance 92 to the junction 102, line 103 to the return terminal of motor 27. Alternatively, another course is traceable beginning at junction 83 through the holding resistor 87, terminal 86, manual contactor 93, contactor 89 and the bimetallic element of thermostat 88, lines 101 and 103 to the return terminal of motor 27.

Of the two paths just described, the latter one is the preferred because resistance 87 is of lower ohmage than resister 92, hence, the voltage of motor 27 will be diminished from twenty-four to approximately sixteen. The latter voltage is just enough to balance the return force of involute spring 43. Accordingly, the apparatus will remain dormant until the heat call has been satisfied, and the thermostatic element is withdrawn from its contactor 89. When this happens, the former described of the alternative courses alone will prevail, the latter being interrupted at the thermostatic contact point 89 and because of the higher resistance of resistor 92, the voltage to motor 27 will be inadequate to withstand the force of involute spring 43 and in exerting some force the motor will act merely as a braking element to retard the restoration movement of the gear train. It is to be observed that during restoration, gear wheel 48 and contact plate 51 will undergo counter-clockwise rotation as illustrated in Fig. 11, which shows an intermediate condition of operation.

It will thus be seen that the electric motor functions as a power unit during the heat demand cycle and as a retarder during the restoration cycle. In addition by virtue of the mass of its armature and the frictional losses in the gear train, the apparatus will also function as a governor in the event that electric power from source 24 become cut off for whatever reasons, particularly, during the heat demand or calling cycle.

While the present invention has been explained and described with reference to a particular embodiment, it is to be understood, nevertheless, that numerous modifications and variations may be incorporated without departing from the essential spirit of scope thereof. It is not intended, therefore, to limit the scope of this invention in accordance with the details of the accompanying drawings, nor by the terms of the foregoing specification except as indicated in the hereunto appended claims.

The invention claimed is:

1. In a damper and draft control apparatus, a power shaft having crank arm means for operating damper and draft regulating mechanism, an electric motor, a gear train between said electric motor and said power shaft, a loading spring in opposition to said motor having meshing relation with said gear train, motor checking and motor braking resistances, and electric circuit means under thermostatic supervision for varying the current introduced to said motor through said resistances whereby to effect motor driving, motor checking, and motor braking control in opposition to said loading spring.

2. In a temperature regulating apparatus, a function shaft, an electric distributor apparatus carried by said function shaft, a series of circuit control wipers engaging said distributor, an electric motor, a gear train between said motor and said function shaft, a mechanical restoration means meshing with said gear train, and circuit connections through said distributor and wipers including a plurality of variable resistances for regulating the current voltage to said electric motor under the supervision of a thermostatic control device.

3. In an automatic temperature regulating apparatus, a draft regulating shaft, an electric distributor apparatus carried by said shaft, a series of circuit control contactors engaging said distributor, an electric motor, a thermostatic control device, a gear train between said motor and said regulating shaft, a mechanical restoration means meshing with said gear train, and circuit connections through said circuit control contactors including a plurality of variable resistances for regulating the power production of said electric motor under the supervision of said thermostatic control device.

4. In a temperature regulating apparatus, an operating shaft, an electric motor, a reduction gear system between said motor and said shaft for attaining a mechanical advantage for said motor in rotating said operating shaft, an electric circuit connecting a source of electrical power with said motor including a plurality of electrical resistances, a room thermostat, circuit switching means including mechanism under the control of said room thermostat and said operating shaft for varying the current from said source to said motor, and a loading spring in said gear system in opposition to said motor for checking limited torque action of said motor and for restoring said operating shaft in the event of current source failure to said motor.

5. In a heating control apparatus, a single directional electric motor, a train of speed reducing gears driven by said motor affording a circular face of electrical insulating material which carries a contact bridging plate, said face adapted to describe rotary movement through a distance less than a full revolution, an involute loading spring having its active end secured to an intermediate shaft of said gear train for yieldably opposing the rotation of said electric motor and for receiving a torque storage load from said motor comprising a plurality of revolutions, an operating circuit connecting a source of electrical power with said motor including a plurality of parallel paths containing different resistance values, and contacts associated with said parallel paths and made electrically communicable by said face bridging plate to introduce alternatively said different resistance values into said operating circuit for thereby regulating the current from said source to said motor to effect motor driving, motor checking, and motor braking control in cooperation with said involute loading spring.

6. In an apparatus for regulating central heating units, a unitary controlled device comprising a main operating shaft, draft and damper control means carried by said shaft, a driven gear rotatable with said shaft affording an electrically insulated face which carries a contact bridging plate, said shaft and gear adapted to describe rotary movement through a distance less than a full revolution, a separate reduction gear train having meshing engagement with said driven gear, an electric motor for actuating said gear train, a torque spring having its active end secured to an intermediate shaft of said gear train for yieldably opposing the direction of rotation of said motor and for receiving a restorative loading from said motor, a circuit connecting a source of electrical power to said motor including alternative paths each containing a different electrical resistance component, and various circuit closing means under control of said bridging plate for cutting into and out of circuit different ones of resistance components where thereby regulating said main control shaft through the guidance of said electric motor.

BERNARD A. RATAZAK.

REFERENCES CITED

The following references are of record in the file of this patent:

UNITED STATES PATENTS

| Number | Name | Date |
| --- | --- | --- |
| 2,112,218 | Gille | Mar. 22, 1938 |
| 2,222,990 | Shipley et al. | Nov. 26, 1940 |